(12) United States Patent
Ali et al.

(10) Patent No.: US 6,671,865 B1
(45) Date of Patent: Dec. 30, 2003

(54) HIGH DENSITY INPUT OUTPUT

(75) Inventors: Anwar Ali, San Jose, CA (US); Farshad Ghahghahi, Los Gatos, CA (US); Edwin M. Fulcher, Palo Alto, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/994,567

(22) Filed: Nov. 27, 2001

(51) Int. Cl.$^7$ .............................. G06F 17/50; G06F 9/45
(52) U.S. Cl. .................. 716/8; 716/1; 716/2; 716/9; 716/10; 438/460; 438/462
(58) Field of Search ................. 716/2, 8; 713/600; 439/71, 66; 438/612, 462, 460, 14, 129, 111, 106; 382/232; 365/63; 361/760, 704, 111; 331/108 C; 324/767, 765; 257/778, 678, 401, 373, 369

(56) References Cited

U.S. PATENT DOCUMENTS

| | | | |
|---|---|---|---|
| 4,920,398 A | * 4/1990 | Yoshio et al. ............... 257/369 |
| 5,376,588 A | 12/1994 | Pendse |
| 5,696,027 A | 12/1997 | Crane, Jr. |
| 5,721,151 A | * 2/1998 | Padmanabhan et al. ..... 438/462 |
| 5,952,726 A | 9/1999 | Liang |
| 6,048,753 A | 4/2000 | Farnworth |
| 6,064,113 A | 5/2000 | Kirkman |
| 6,111,756 A | 8/2000 | Moresco |
| 6,198,635 B1 | 3/2001 | Shenoy et al. |
| 6,483,714 B1 | * 11/2002 | Kabumoto et al. ......... 361/760 |
| 2002/0056857 A1 | * 5/2002 | Iwasa ........................ 257/203 |

OTHER PUBLICATIONS

U.S. patent application entitled "Wire Bond Package with Core Ring Formed Over I/O Cells" filed on Feb. 20, 2002 (pending) US Ser. No. 10/082,027 First Named Inventor: Radoslav Ratchkov.

* cited by examiner

Primary Examiner—Vuthe Siek
Assistant Examiner—Helen Rossoshek
(74) Attorney, Agent, or Firm—Luedeka, Neely & Graham PC (57) ABSTRACT

An input/output array of an integrated circuit comprises concentric rings of input/output tiles. The peripheral input/output tiles are adjacently arranged along the periphery of the integrated circuit to form a peripheral ring. Each of the peripheral input/output tiles is associated with a corresponding peripheral input/output device group having x1 number of input/output devices. Each peripheral input/output tile includes x1 number of signal contacts for coupling signals to corresponding ones of the x1 number of input/output devices, y1 number of input/output driver voltage contacts for coupling a source voltage to drivers of the x1 number of input/output devices, and z1 number of ground contacts. The interior input/output tiles are adjacently arranged within the interior of the integrated circuit to form n number of substantially concentric interior rings, where n is greater than or equal to one.

20 Claims, 5 Drawing Sheets

HIGH DENSITY INPUT OUTPUT

FIELD

This invention relates to the field of integrated circuits. More particularly, the invention relates to a standardized and selectively configurable high density input/output array and flexible placement of input/output devices within the array.

BACKGROUND

Integrated circuit packages, such as application specific integrated circuit (ASIC) flip chips, typically include an array of electrical contacts for providing electrical input/output (IO) connection between the integrated circuit and a package substrate. Generally, the array of IO contacts provides direct connection between the integrated circuit and the package substrate without the use of wire bonds. Typically, the IO contacts are bumps of solder deposited on the integrated circuit in a particular pattern.

Within the integrated circuit there are IO devices, also referred to as IO cells, associated with each of the IO signals. In traditional designs, the IO devices are placed only along the periphery of the integrated circuit, and their associated contacts are located in an array around the integrated circuit. Metal traces within a redistribution metal layer are typically used to connect the IO devices to the IO contacts.

Placing the IO devices only along the periphery of the integrated circuit has several disadvantages. For circuits having a large number of IO devices, restricting the IO devices to only the periphery results in unnecessarily large integrated circuit sizes. As integrated circuit sizes increase to accommodate more and more IO devices, the length of the redistribution traces between the IO devices and the contacts typically must also increase, which degrades the performance of the integrated circuit. Placing the IO devices only along the periphery also results in long net connections to the core logic of the integrated circuit, which also degrades performance. Further, for a fixed integrated circuit size, restricting the IO devices to only the periphery limits the attainable IO density.

However, placing the IO devices along the periphery of the integrated circuit has typically been a preferred practice, because it tends to make the IO array more standardized, and thus tends to reduce production and packaging costs. In other words, developing and implementing customized IO arrays for every different integrated circuit design has been avoided in the past as being a prohibitively expensive and time consuming solution, the implementation of which tends to be worse than the problems which it is intended to resolve.

What is needed, therefore, is a placement pattern for IO devices and contacts on an integrated circuit which tends to alleviate the problems described above.

SUMMARY

The above and other needs are met by an input/output array having concentric rings of input/output tiles. The peripheral input/output tiles are adjacently arranged along the periphery of the integrated circuit to form a peripheral ring. Each of the peripheral input/output tiles is associated with a corresponding peripheral input/output device group which includes x1 number of input/output devices. Each peripheral input/output tile includes x1 number of signal contacts for coupling signals to corresponding ones of the x1 number of input/output devices, y1 number of input/output driver voltage contacts for coupling a source voltage to drivers of the x1 number of input/output devices, and z2 number of ground contacts.

The array also includes interior input/output tiles. The interior input/output tiles are adjacently arranged within the interior of the integrated circuit to form n number of substantially concentric interior rings, where n is greater than or equal to one. The n number of interior rings are substantially concentric with the peripheral ring. Each of the interior input/output tiles is associated with a corresponding interior input/output device group which includes x2 number of input/output devices. Each interior input/output tile includes x2 number of signal contacts for coupling signals to corresponding ones of the x2 number of input/output devices, y2 number of input/output driver voltage contacts for coupling a source voltage to drivers of the x2 number of input/output devices, and z2 number of ground contacts.

In this manner there is formed one or more standardized configurable input/output tiles for forming a selectively configurable input/output array for a variety of differently configured integrated circuits, where a plurality of the standardized configurable input/output tiles are selectively combinable into the input/output array in a fashion that is selectively configurable for the variety of differently configured integrated circuits. Thus, the standardized configurable input/output tiles can be configured in different ways to adapt to different integrated circuit designs, while maintaining their standardized nature, which tends to keep design costs, material costs, and inventory costs low. Therefore, a balance between standardization and configurability is struck.

In preferred embodiments of the invention, the signal contacts, input/output driver voltage contacts, and ground contacts of each peripheral input/output tile, and the corresponding peripheral input/output device group are aligned substantially perpendicular to an outer edge of the integrated circuit, nominally the nearest outer such outer edge. Also, in some preferred embodiments, the signal contacts, input/output driver voltage contacts, and ground contacts of each interior input/output tile, and the corresponding interior input/output device group are aligned substantially perpendicular to the outer edge of the integrated circuit.

Some preferred embodiments of the invention include n number of filler input/output tiles. At least one of the n number of filler input/output tiles is disposed between the peripheral ring and an outermost of the n number of interior rings. At least n−1 of the n number of filler input/output tiles are disposed between the n number of interior rings. Each of the filler input/output tiles includes one or more core voltage contacts for supplying power to circuit devices on the integrated circuit other than input/output devices, and one or more ground contacts.

Some preferred embodiments of the invention include a center input/output tile disposed within an innermost of the n number of interior rings. The center input/output tile includes one or more core voltage contacts for supplying power to circuit devices on the integrated circuit other than input/output devices, one or more input/output driver voltage contacts for coupling a source voltage to drivers of input/output devices, and one or more ground contacts.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The present invention is directed to a placement pattern for an array of input/output (IO) devices and their associated IO contacts on an integrated circuit. Generally, the pattern consists of a number of basic building blocks, referred to herein as tiles, which are repeated across the plan area of an integrated circuit die. Each tile generally defines a particular area or space on the integrated circuit within which is disposed a combination of IO signal contacts, ground contacts, and source voltage contacts arranged in a particular geometric pattern. In several of the figures, tiles are depicted as being bounded by a solid line. It should be appreciated that the line does not represent any sort of physical discontinuity or separation in the substrate material of the integrated circuit, but rather is provided only to represent an arbitrary boundary of the tile. As described in more detail below, several different types of tiles having different geometries or component placement patterns are provided by the invention. These tiles include peripheral tiles, interior tiles, filler tiles, and a center tile.

It is anticipated that different configurations of such tiles are included in a compilation such as a standardized library, from which specific tiles are then selected and configured according to pre-designed embodiments as required to rout out a given integrated circuit.

Figure 1A:
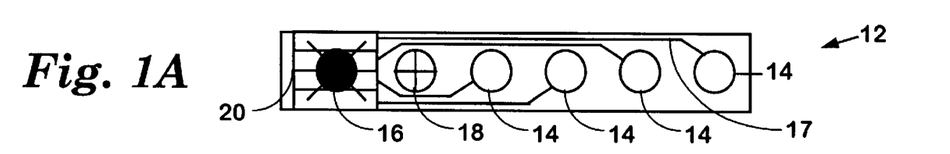
FIG. 1A depicts a peripheral input/output tile having a single line topology according to a preferred embodiment of the invention.
Figure 1B:
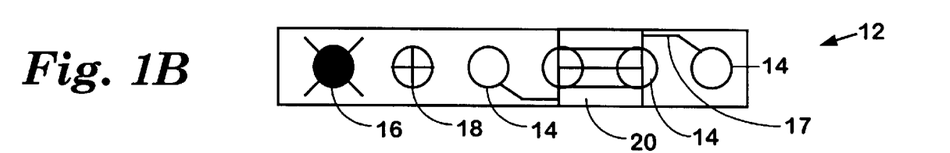
FIG. 1B depicts a peripheral input/output tile having a single line topology according to an alternative embodiment of the invention.
Figure 1C:
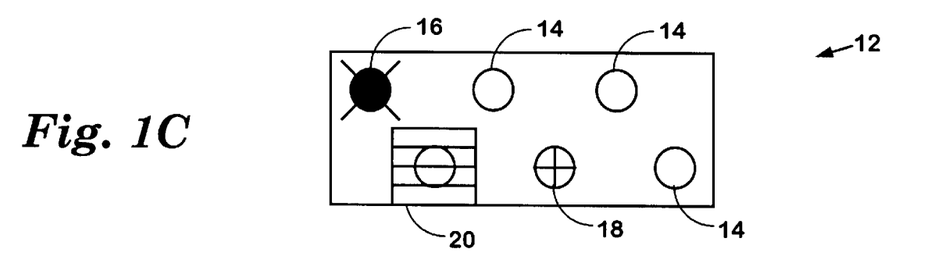
FIG. 1C depicts a peripheral input/output tile having a staggered topology according to a preferred embodiment of the invention.
Figure 1D:
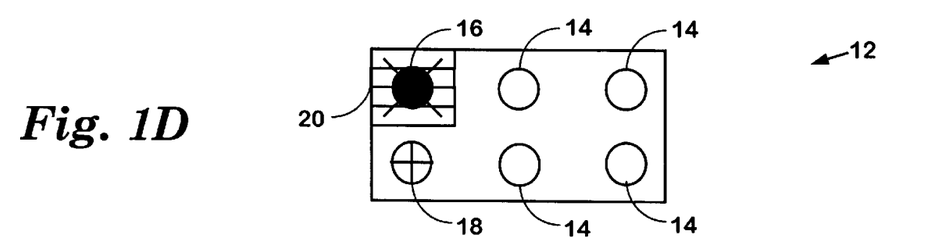
FIG. 1D depicts a peripheral input/output tile having a multiple line topology according to a preferred embodiment of the invention.

Referring now to FIGS. 1A–1D, there are depicted four different embodiments of a peripheral tile 12, which is designed for placement along the periphery of an integrated circuit die. Preferably, within each peripheral tile 12 are IO signal contacts 14, die voltage contacts 16, and ground contacts 18. The contacts 14, 16, and 18 within each peripheral tile 12 may be arranged in any arbitrary topology or order. FIGS. 1A and 1B depict examples of a single-line topology, and FIGS. 1C and 1D depict examples of staggered and multi-line topologies, respectively.

The term "contact" as used herein generally refers to a discrete electrical connection point on an integrated circuit, which connection point provides direct electrical connection between the integrated circuit and a package substrate to which the integrated circuit is attached. In preferred embodiments, the contacts are bumps of solder deposited on the integrated circuit in a particular pattern or array. However, it is appreciated that the invention is not limited to any particular type of contact.

Associated with each peripheral tile 12 is a corresponding group of IO devices 20. The IO devices 20 generally include circuit components, such as transistors, which provide signal conditioning for IO voltage signals transferred between the IO signal contacts 14 and core logic, memory, and other circuit components. Each group of IO devices 20 generally includes x1 number of IO devices 20, and each peripheral input/output tile 12 generally includes x1 number of associated IO signal contacts 14, where x1 may be any number, such as four or six. Since each signal contact 14 provides a signal connection to an associated IO device 20, there are preferably the same number of signal contacts 14 within each tile 12 as there are IO devices 20 within each group of IO devices 20. Preferably, the group of IO devices 20 is initially positioned within the peripheral tile 12 at a default location, which is the position at which the group of IO devices 20 will remain if no adjustments are required by the designer during the design process. Preferably, the default location of the group of IO devices 20 may be arbitrarily defined. Considerations concerning placement of the groups of IO devices 20 during the ASIC design process are discussed in more detail below.

The driver voltage contacts 16, also referred to herein as a VDDIO contacts, provide a source voltage to drivers of the IO devices 20. The ground contacts 18 provide a ground or common return connection for the IO devices 20 and other devices in the integrated circuit. Each peripheral tile includes y1 number of driver voltage contacts 16 and z1 number of ground contacts 18, where y1 and z1 may be any number, including zero. In a preferred embodiment, y1 and z1 are one.

In the embodiments of a peripheral tile 12 depicted in FIGS. 1A–D, x1 is four, y1 is one, and z1 is one. In an alternative embodiment, x1 is six, y1 is one, and z1 is one. However, it should be appreciated that each peripheral tile 12 may include other numbers of signal contacts 14, driver voltage contacts 16, and ground contacts 18. Thus, the invention is not limited to any particular number or ratio of contacts within each peripheral tile 12.

As shown in FIGS. 1A and 1B, electrical connection between each IO device 20 and its associated IO signal contact 14 is preferably made by anelectrical conductor, such as a redistribution trace 17. In the preferred embodiment, the redistribution traces 17 are provided in a single metal interconnect layer of the integrated circuit die IO, but could also be provided in several separate layers. By default, the IO devices 20 are in close proximity to their associated IO signal contacts 14, driver voltage contacts 16, and ground contacts 18, thereby minimizing the length of the redistribution traces 17. Minimizing the length of the redistribution traces 17 tends to minimize electrical resistance and inductance associated with the traces 17, thereby enhancing circuit performance. Also, placing the IO devices 20 close to the driver voltage contacts 16 and ground contacts 18 tends to minimize noise, such as SSO noise. However, there are additional considerations in the placement of the IO devices 20, as described in more detail below.

Figure 3:
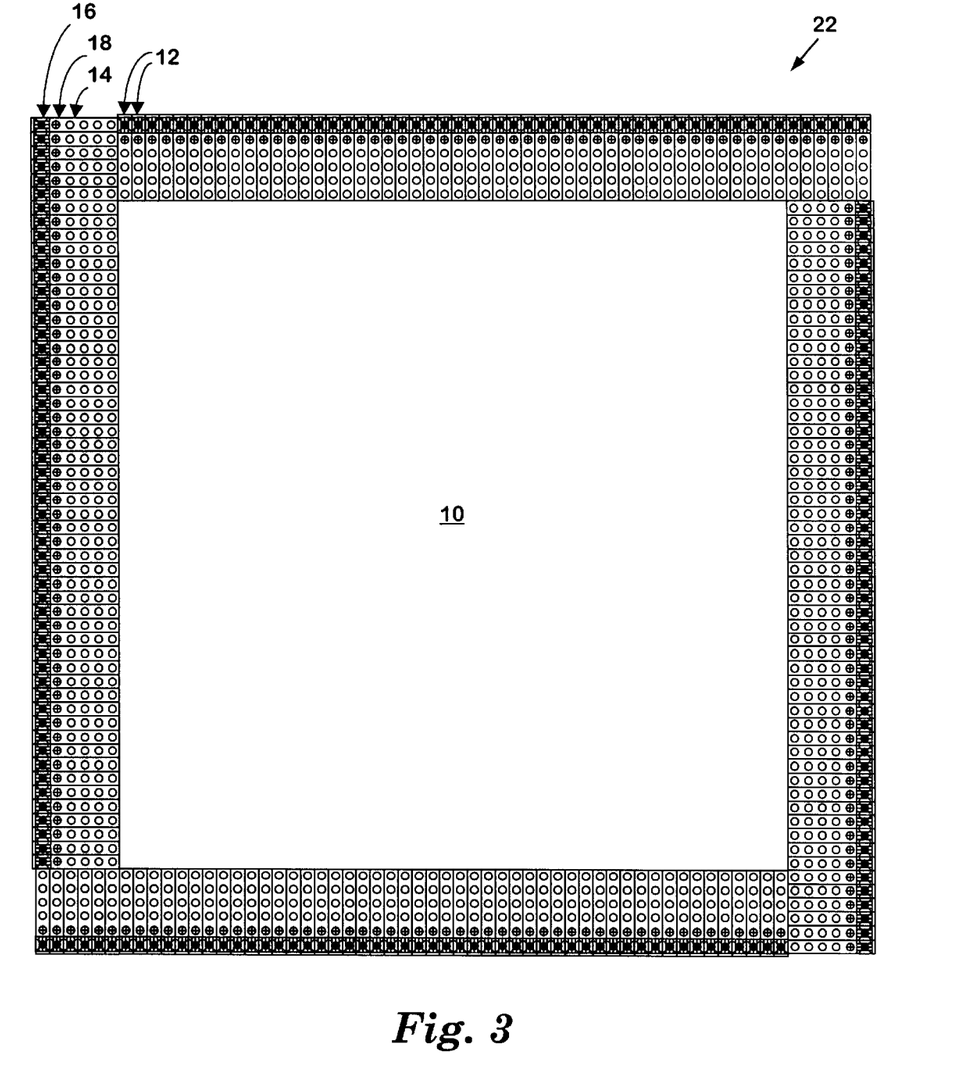
FIG. 3 depicts an input/output array of an integrated circuit having a peripheral ring consisting of adjacent peripheral input/output tiles according to a preferred embodiment of the invention.

As depicted in FIG. 3, peripheral tiles 12 are preferably disposed side-by-side along an outer edge of the integrated circuit IO to form a peripheral ring 22 of the IO array. As shown, the signal contacts 14, driver voltage contacts 16, and ground contacts 18 of each tile 12 are preferably aligned substantially perpendicular to what is nominally the nearest outer edge of the circuit 10. It is appreciated that some of the tiles 12 may be as near to one outer edge as they are to another, and that they are preferably aligned in a manner which tends to preserve symmetry and tends to optimize the number of such tiles 12 in the IO array.

The repeating pattern of peripheral tiles 12 is preferably rotated by ninety degrees at each corner of the ring 22. The size of the IO matrix or array on the circuit IO is generally defined by the number of contacts disposed along the outer edge of the circuit 10. The array depicted in FIG. 3 is a 60×60 array. However, it will be appreciated that the invention is not limited to any particular size of array.

Figure 2:
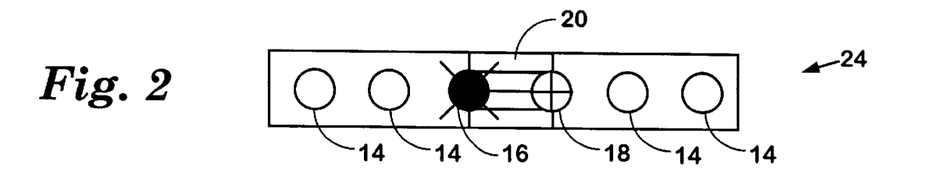
FIG. 2 depicts an interior input/output tile having a single line topology according to a preferred embodiment of the invention.

Referring now to FIG. 2, there is depicted a preferred embodiment of an interior tile 24, which is designed for placement within the interior of the integrated circuit die 10. Preferably, within each interior tile 24 are IO signal contacts 14, driver voltage contacts 16, and ground contacts 18. As with the peripheral tile 12, the contacts 14, 16, and 18 within each interior tile 24 may be arranged in any arbitrary topology or order. Each interior tile 24 includes x2 number of IO signal contacts 14 which are associated with a group of x2 number of IO devices 20. Each interior tile 24 also includes y2 number of driver voltage contacts 16 and z2 number of ground contacts 18. The values of x2, y2, and z2 may be any number, including zero. In a preferred embodiment, x2 is four, and y2 and z2 are one. In an alternative embodiment, x2 is six, y2 is one, and z2 is one. However, it should be appreciated that each interior tile 24 may include other numbers of signal contacts 14, driver voltage contacts 16, and ground contacts 18. Thus, the invention is not limited to any particular number or ratio of contacts within each interior tile 24.

Figure 4:
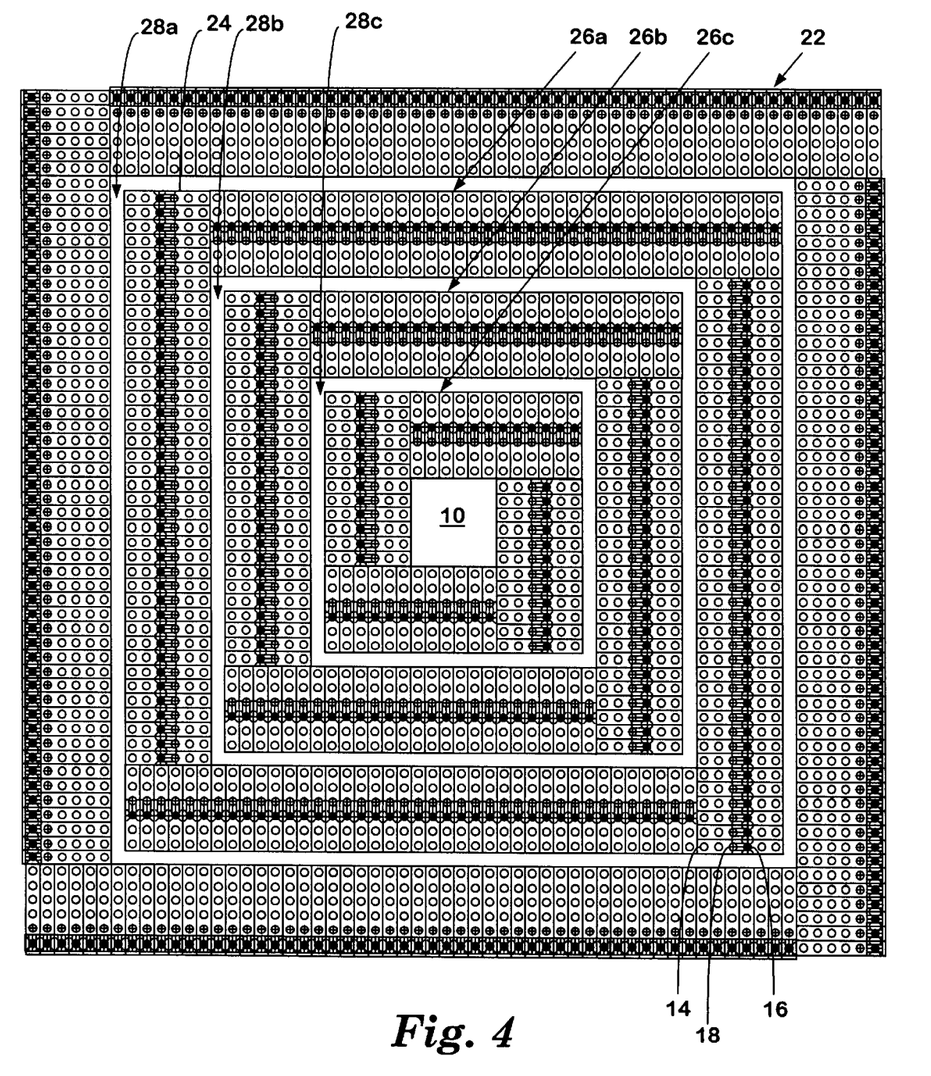
FIG. 4 depicts an input/output array of an integrated circuit having a peripheral ring consisting of adjacent peripheral input/output tiles, and three concentric interior rings consisting of adjacent interior input/output tiles according to a preferred embodiment of the invention.

As depicted in FIG. 4, interior tiles 24 are preferably disposed side-by-side within the interior of the integrated circuit 10 to form one or more interior rings which are substantially concentric with the peripheral ring 22. In the embodiment depicted in FIG. 4, there are three interior rings 26a, 26b, and 26c. However, it should be appreciated that the invention is not limited to any particular number of interior rings. As shown in FIG. 4, the signal contacts 14, driver voltage contacts 16, and ground contacts 18 of each interior tile 24 are preferably aligned substantially perpendicular to the nearest outer edge of the circuit 10. The repeating pattern of interior tiles 24 is preferably rotated by ninety degrees at each corner of each interior ring 26a, 26b, and 26c.

Figure 5:
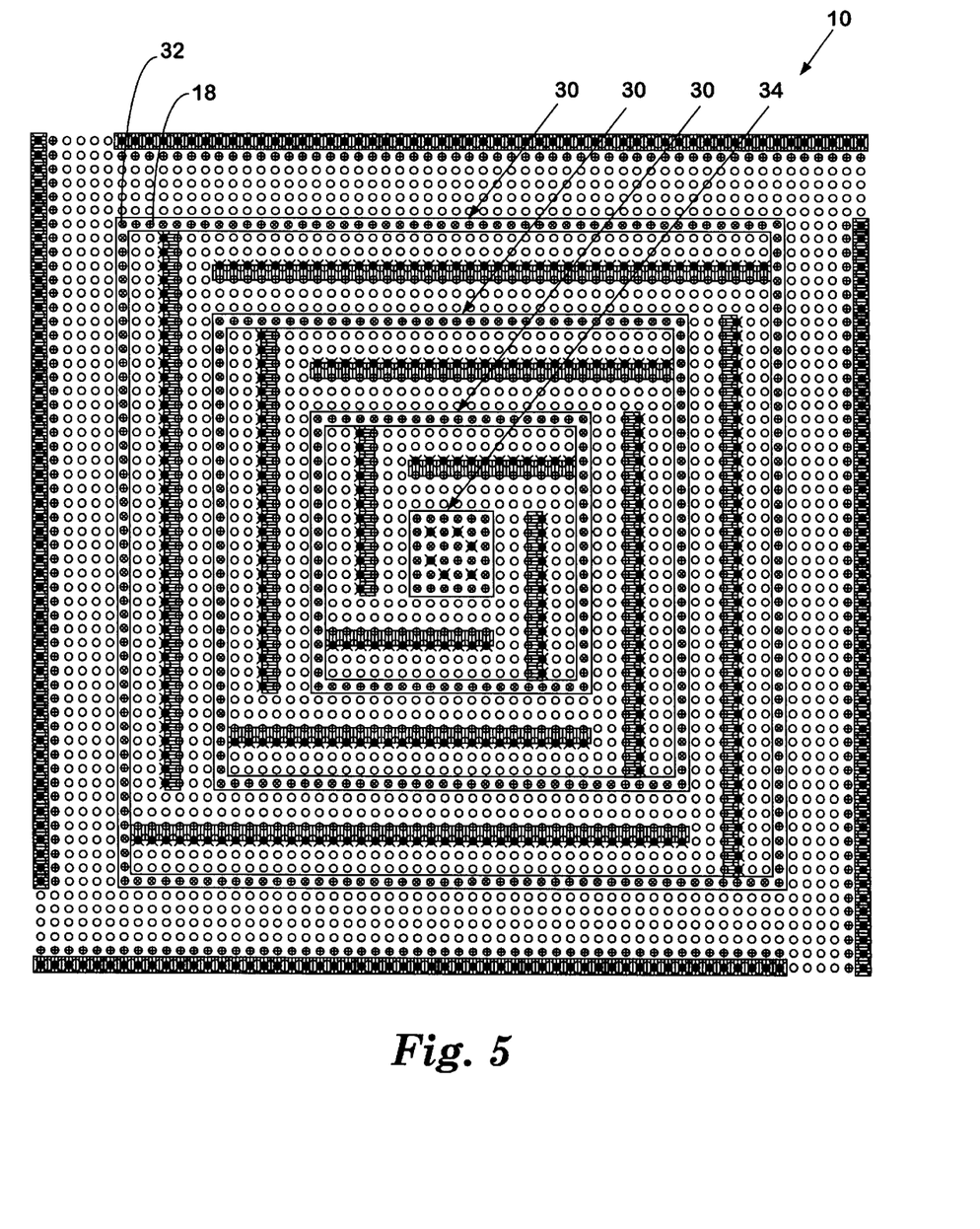
FIG. 5 depicts an input/output array of an integrated circuit having a peripheral ring consisting of adjacent peripheral input/output tiles, three concentric interior rings consisting of adjacent interior input/output tiles, three filler input/output tiles, and a center input/output tile according to a preferred embodiment of the invention.

As shown in FIG. 5, the preferred embodiment of the invention includes filler tiles 30 disposed between the peripheral ring 22 and the interior ring 26a, and between the interior rings 26a, 26b, and 26c. Preferably, within each filler tile 30 are core voltage contacts 32 and ground contacts 18 aligned substantially in parallel with the nearest outer edge of the integrated circuit 10. The core voltage contacts 32 provide source voltages to core logic devices, macros, and other non-IO devices within the integrated circuit 10. Driver voltage contacts 16 may also be provided within the filler tiles 30, although none are depicted in the filler tiles 30 of FIG. 5. The contacts within each filler tile 30 may be arranged in any arbitrary order, and there may be any number of each type of contact.

In an alternate embodiment as depicted in FIG. 4, between the peripheral ring 22 and the interior ring 26a is a gap 28a, and between the interior rings 26a, 26b, and 26c are gaps 28b and 28c. Thus, in this alternative embodiment, there are no filler tiles 30. The widths of the gaps 28a, 28b, and 28c may be any arbitrary value, including zero.

With reference again to FIG. 5, the preferred embodiment of the invention includes a rectangular center tile 34 disposed substantially in the center of the circuit 10. Within the center tile 34 are any number of core voltage contacts 32, driver voltage contacts 16, and ground contacts 18, preferably arranged in a diagonally-symmetric quadratic pattern.

Figure 6:
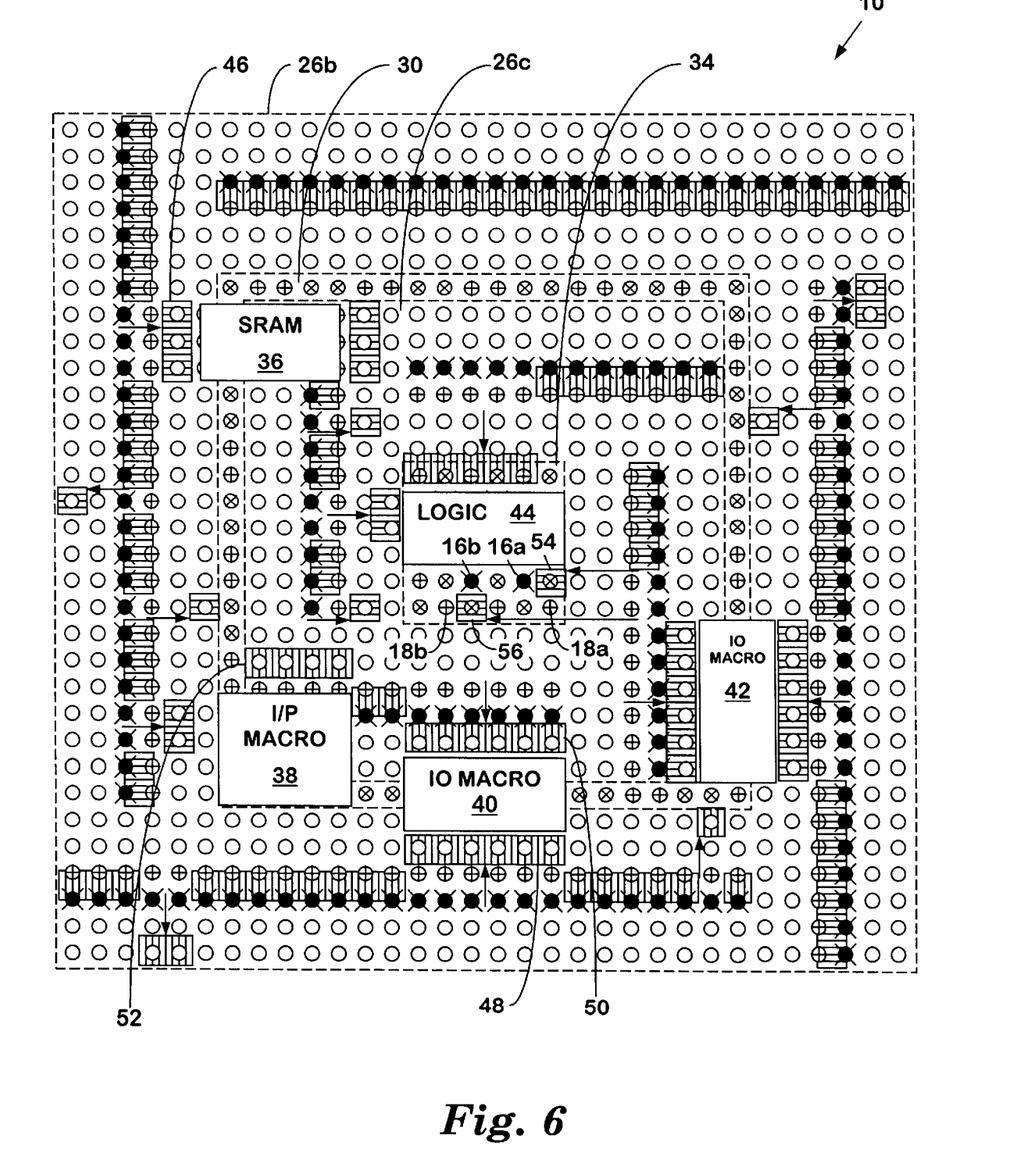
FIG. 6 depicts circuit sections coupled to an input/output array on an integrated circuit according to a preferred embodiment of the invention.

FIG. 6 is an enlarged view of a portion of the contact array of FIG. 5. In particular, FIG. 6 depicts the interior rings 26b and 26c, the filler tile 30 between rings 26b and 26c, and the center tile 34. Also depicted are several exemplary circuit sections on the integrated circuit 10, including an SRAM section 36, an I/P macro 38, two IO macros 40 and 42, and a core logic circuit 44. As shown in FIG. 6, any block of IO device groups, such as IO device block 46, may be relocated within their tiles 12 (as indicated by the arrows) during the design process from their default location to a new location which is closer to their associated circuit section. By so doing, the traces of the redistribution layer that connect the IO devices 20 to their logic elements of the integrated circuit tend to be shorter, with the attendant benefits as mentioned above. Preferably, each interior IO device block includes one or more IO device groups of x2 number of IO devices within one or more adjacent interior tiles, and each peripheral IO device block includes one or more IO device groups of x1 number of IO devices within one or more adjacent peripheral tiles.

In the preferred embodiment, each IO device block may be moved in a direction perpendicular to the nominally nearest edge of the integrated circuit 10. For example, IO device block 46 (which includes twelve IO devices associated with three interior tiles 20) may be moved to the right to be in closer proximity to the SRAM section 36. As also depicted in FIG. 6, IO device block 48 may be moved up and IO device block 50 may be moved down to be in closer proximity to the IO macro section 40. Such moves are considered to be standardized configurations of the selectively configurable IO tiles 20. However, in alternate embodiments, the IO device blocks may also be moved in parallel to the nominally nearest edge of the integrated circuit 10. These are also considered to be standardized configurations of the selectively configurable IO tiles 20. Thus, it is appreciated that the invention is not limited to any particular direction of movement in relocating the IO device block from their default locations.

The ease of relocating IO device blocks from default locations to other positions during the design process offers several significant advantages over prior contact array schemes. For example, moving the IO device blocks closer to associated core logic circuits enhances the performance of the integrated circuit 10. The IO array of the present invention also provides for moving IO devices to avoid overlap with large macros, such as memory blocks or I/P blocks. For example, as shown in FIG. 6, IO device block 52 may be relocated upward to avoid overlap with I/P macro 38.

It is appreciated that the present invention permits IO devices 20 to be located near wide high speed IO interface macros, such as the GIGABLAZE® and HYPERPHY® COREWARE® macros manufactured by LSI Logic, Inc., which were originally designed for peripheral IO placement. By default, the groups of IO devices 20 of the present invention are aligned in concentric squares within the integrated circuit 10 in a manner compatible with the connection arrangement of the above-mentioned IO interface blocks. In previous IO placement schemes, IO interface blocks originally designed for peripheral IO placement had to be redesigned to be compatible with IO devices placed near the center of the die. Such a redesign process, which is expensive and time consuming, is not necessary with the contact array of the present invention.

In the preferred embodiment of the invention, IO devices 20 are connected to the nearest available ground contact 18 and driver voltage contact 16. For example, as shown in FIG. 6, after relocating IO device group 54 to the left, the nearest ground contact is 18a and the nearest driver voltage contact is 16a, which are included in the center tile 34. Also, after relocating IO device group 56 to the left, the nearest ground contact is 18b and the nearest driver voltage contact is 16b, which are also included in the center tile 34. Thus, the additional ground contacts 18 and driver voltage contacts 16 provided in the center tile 34 and in the filler tiles 30 serve to minimize the length, and therefore the inductance, of redistribution traces connecting these contacts to IO devices 20.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An input/output array of an integrated circuit, the integrated circuit having a periphery and an interior, the array formed of standardized configurable tiles comprising:

a plurality of peripheral input/output tiles, the peripheral input/output tiles adjacently arranged along the periphery of the integrated circuit to form a peripheral ring, each of the peripheral input/output tiles associated with a corresponding peripheral input/output device group having x1 number of input/output devices, each of the peripheral input/output tiles including:

x1 number of signal contacts for coupling signals to corresponding ones of the x1 number of input/output devices, y1 number of input/output driver voltage contacts for coupling a source voltage to drivers of the x1 number of input/output devices, and z1 number of ground contacts, and a plurality of interior input/output tiles, the interior input/output tiles adjacently arranged within the interior of the integrated circuit to form n number of substantially concentric interior rings, where n is greater than or equal to one, the n number of interior rings substantially concentric with the peripheral ring, each of the interior input/output tiles associated with a corresponding interior input/output device group having x2 number of input/output devices, each of the interior input/output tiles including:

x2 number of signal contacts for coupling signals to corresponding ones of the x2 number of input/output devices, y2 number of input/output driver voltage contacts for coupling a source voltage to drivers of the x2 number of input/output devices, and z2 number of ground contacts.

2. The input/output array of claim 1 wherein the signal contacts, input/output driver voltage contacts, and ground contacts of each peripheral input/output tile, and the corresponding peripheral input/output device group, are aligned substantially perpendicular to an adjacent outer edge of the integrated circuit.

3. The input/output array of claim 1 wherein the corresponding peripheral input/output device group associated with at least one of the peripheral input/output tiles is offset relative to the peripheral input/output device groups associated with others of the peripheral input/output tiles in a direction substantially perpendicular to an adjacent outer edge of the integrated circuit.

4. The input/output array of claim 1 wherein the signal contacts, input/output driver voltage contacts, and ground contacts of each interior input/output tile, and the corresponding interior input/output device group are aligned substantially perpendicular to a nearest outer edge of the integrated circuit.

5. The input/output array of claim 1 wherein the corresponding interior input/output device group associated with at least one of the interior input/output tiles is offset relative to the interior input/output device groups associated with others of the interior input/output tiles in a direction substantially perpendicular to an outer edge of the integrated circuit.

6. The input/output array of claim 1 further comprising n number of filler input/output tiles, at least one of which is disposed between the peripheral ring and an outermost of the n number of interior rings, and at least n−1 of which are disposed between the n number of interior rings, each filler input/output tile comprising:

one or more core voltage contacts for supplying power to circuit devices on the integrated circuit other than input/output devices, and one or more ground contacts.

7. The input/output array of claim 6 wherein the core voltage contacts and ground contacts of each filler input/output tile arc aligned substantially parallel with a nearest outer edge of the integrated circuit.

8. The input/output array of claim 1 further comprising a center input/output tile disposed within an innermost of the n number of interior rings, comprising:

one or more core voltage contacts for supplying power to circuit devices on the integrated circuit other than input/output devices, one or more input/output driver voltage contacts for coupling a source voltage to drivers of input/output devices, and one or more ground contacts.

9. The input/output array of claim 8 wherein the core voltage contacts, input/output driver voltage contacts, and ground contacts of the center input/output tile are arranged in a diagonally-symmetric quadratic pattern.

10. The input/output array of claim 1 wherein x1 is four, y1 is one, and z1 is one.

11. The input/output array of claim 1 wherein x2 is four, y2 is one, and z2 is one.

12. The input/output array of claim 1 wherein each input/output device of each peripheral input/output device group and interior input/output device group is electrically coupled via an electrical conductor to a nearest input/output driver voltage contact of any peripheral input/output device group and interior input/output tile, thereby reducing electrical inductance of the electrical conductor.

13. The input/output array of claim 1 wherein each input/output device of each peripheral input/output device group and interior input/output tile is electrically coupled via an electrical conductor to a nearest ground contact of any peripheral input/output device group and interior input/output tile, thereby reducing electrical inductance of the electrical conductor.

14. A standardized configurable input/output tile for forming a selectively configurable input/output array for a variety of differently configured integrated circuits, the input/output tile comprising:
- an input/output group having x1 number of input/output circuits, the input/output group having a selectively configurable location within the input/output tile,
- x1 number of signal contacts for coupling signals to the x1 number of input/output circuits,
- y1 number of input/output voltage contacts for coupling a source voltage to the x1 number of input/output circuits, and
- z1 number of ground contacts for coupling a ground to the x1 number of input/output circuits,
- where a plurality of the standardized configurable input/output tiles are selectively combinable into the input/output array in a fashion that is selectively configurable for the variety of differently configured integrated circuits.

15. An input/output array of an integrated circuit, the integrated circuit having a periphery and an interior, the array comprising:
- a plurality of peripheral input/output device groups, each including x1 number of input/output devices,
- a plurality of peripheral input/output tiles, each of the peripheral input/output tiles associated with a corresponding one of the peripheral input/output device groups, the peripheral input/output tiles adjacently arranged along the periphery of the integrated circuit to form a peripheral ring, each of the peripheral input/output tiles including:
  - x1 number of signal contacts for coupling signals to the x1 number of peripheral input/output devices in an associated one of the peripheral input/output device groups,
  - y1 number of input/output driver voltage contacts for coupling a source voltage to drivers of the x1 number of input/output devices in the associated one of the peripheral input/output device groups, and
  - z2 number of ground contacts,
- a plurality of interior input/output device groups, each including x2 number of input output devices, and
- a plurality of interior input/output tiles, each of the interior input/output tiles associated with a corresponding one of the interior input/output device groups, the interior input/output tiles adjacently arranged within the interior of the integrated circuit to form n number of substantially concentric interior rings, where n is greater than or equal to one, the n number of interior rings substantially concentric with the peripheral ring, each of the interior input/output tiles including:
  - x2 number of signal contacts for coupling signals to the x2 number of interior input/output devices in an associated one of the interior input/output device groups,
  - y2 number of input/output driver voltage contacts for coupling a source voltage to drivers of the x2 number of interior input/output devices in the associated one of the interior input/output device groups, and
  - z2 number of ground contacts.

16. The input/output array of claim 15 wherein each peripheral input/output device group and the signal contacts, input/output driver voltage contacts, and ground contacts of the associated peripheral input/output tile are aligned substantially perpendicular to an outer edge of the integrated circuit.

17. The input/output array of claim 16 wherein each peripheral input/output tile occupies a peripheral tile footprint within the plan area of the integrated circuit, and the associated peripheral input/output device group is disposed within the peripheral tile footprint.

18. The input/output array of claim 15 wherein each interior input/output device group and the signal contacts, input/output driver voltage contacts, and ground contacts of the associated interior input/output tile are aligned substantially perpendicular to a nearest outer edge of the integrated circuit.

19. The input/output array of claim 18 wherein each interior input/output tile occupies an interior tile footprint within the plan area of the integrated circuit, and the associated interior input/output device group is disposed within the peripheral tile footprint.

20. The input/output array of claim 15 further comprising:
- n number of filler input/output tiles, at least one of which is disposed between the peripheral ring and an outermost of the n number of interior rings, and at least n−1 of which are disposed between the n number of interior rings, each filler input/output tile comprising:
  - at least one core voltage contact for supplying power to circuit devices on the integrated circuit other than input/output devices, and
  - at least one ground contact, and
- a center input/output tile disposed within an innermost of the n number of interior rings, comprising:
  - at least one core voltage contact for supplying power to circuit devices on the integrated circuit other than input/output devices,
  - at least one input/output driver voltage contact for coupling a source voltage to drivers of input/output devices, and
  - at least one ground contact.

* * * * *